P. K. DEDERICK.

Baling-Press.

No. 9,212. Reissued May 25, 1880.

Attest,
W. H. H. Knight
Wm. Blackstock

Inventor,
P. K. Dederick,
by L. Hill,
His Attorney,

THE NORRIS PETERS CO., WASHINGTON, D. C.

UNITED STATES PATENT OFFICE.

PETER K. DEDERICK, OF ALBANY, NEW YORK.

BALING-PRESS.

SPECIFICATION forming part of Reissued Letters Patent No. 9,212, dated May 25, 1880.

Original No. 152,084, dated June 16, 1874. Application for reissue filed April 24, 1879.

*To all whom it may concern:*

Be it known that I, PETER K. DEDERICK, of Albany, in the county of Albany, State of New York, have invented a new and Improved Baling-Press, of which the following is a specification.

My invention relates to that class of presses for which Letters Patent were granted me October 29, 1872, Nos. 132,566 and 132,639; and it consists, chiefly, in constructing and adapting the machine to be driven by the momentum or power accumulated in a balance wheel or wheels and intermediate gearing.

It should be observed that hay, cotton, and other similar loose material, when baled in this class of presses, offer but little resistance, except as the crank nears the limit of its stroke, so that when a horse-lever is applied to a crank or toggle, cam or eccentric, as in all presses of this class heretofore, the power is required but at one stage of the operation, hence great loss of time. True, in Letters Patent No. 132,639, referred to, a device is shown utilizing part of this loss of time to increase the power; but still full one-half of the time the power of the horse or horses is lost, whereas I now utilize all the power and acquire a strong steady motion capable of accomplishing double the work with the same power.

Following I describe a method of constructing and applying my invention.

Figure 1:
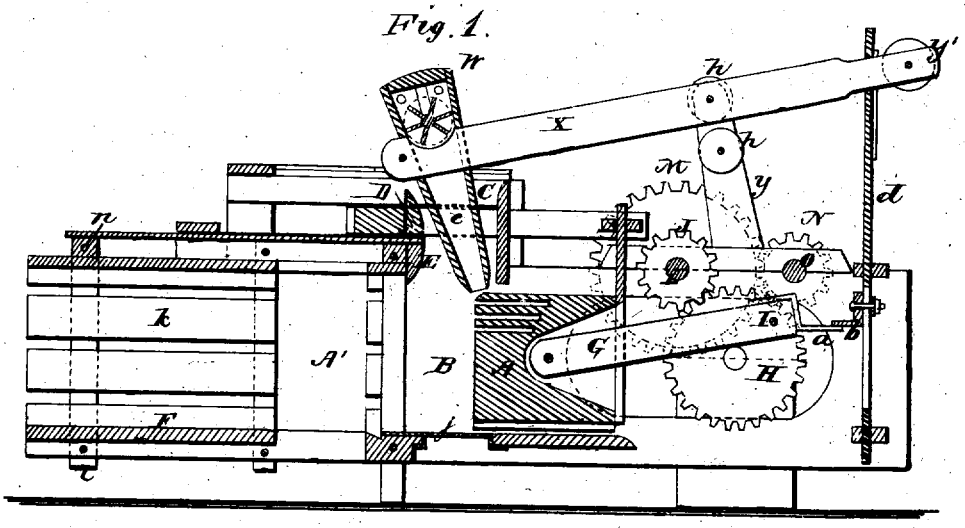
Figure 3:
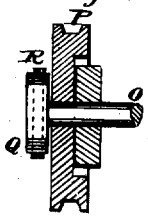
Figure 5:
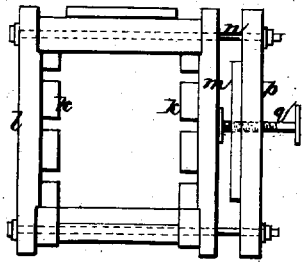
Figure 4:
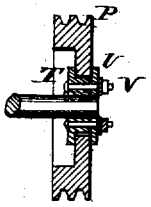
Figure 2:
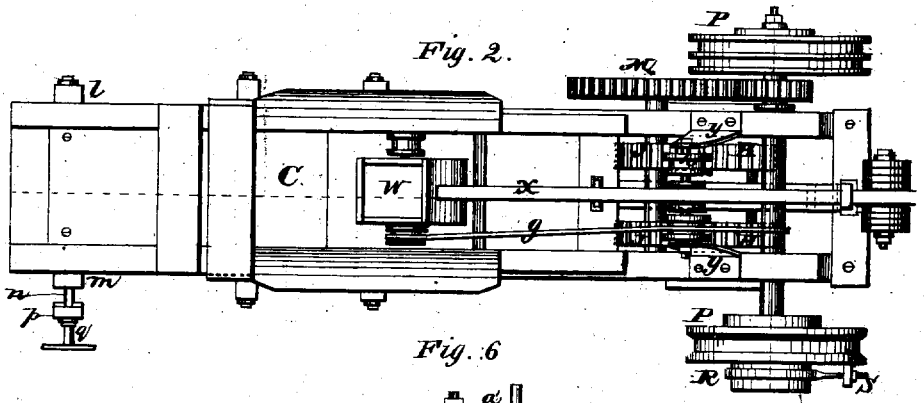
Figure 6:
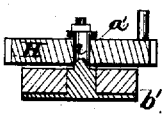

Figure 1 is a longitudinal sectional elevation of a press. Fig. 2 is a plan view. Figs. 3 and 4 are detail sections of the driving-wheels, showing different devices for connecting them to the driving-shaft. Fig. 5 is an end elevation of the press-box, showing the mode of regulating the compression. Fig. 6 is a detail, showing the way the wheels for working the pitman are mounted.

A represents the reciprocating traverser; B, the pressing-chamber; C, the hopper through which the hay is fed into the chamber B; D, an auxiliary condenser or follower for packing the charge of hay into or over the throat E of the hopper. F is the bale chamber and box through which the hay or cotton is pressed along, separated, and bound and forced out in the form of bound bales, all as in presses of this character heretofore patented by me.

I now propose, as a simple and cheap method of forming the crank and pitman or toggle power heretofore employed, to arrange the pitman G between gear-wheels H, which are located on separate fixed studs on the plates $b'$. I now connect the wheel H at a proper distance from the center by a pin, I, fitted in holes bored through the wheels, thus forming a crank which is applied by passing the pin I through a hole in the end of the pitman G. By this method of utilizing the gear-wheels to form the crank I do not add to the amount of gearing, although I do away with a separate crank and crank-shaft journals or bearings, although the latter would produce the same results with the balance-wheel and intermediate gearing.

The crank-wheels H I gear, by pinions J, with a counter-shaft, L, which gears, by a wheel, M, with a pinion, N, on the driving-shaft O, so as to allow the latter to be speeded up to run the press with light belts. Any arrangement of intermediate gearing between the balance-wheels and crank or pitman that will secure the necessary momentum of the balance-wheel will accomplish the result.

I use balance-wheels P for accumulating and balancing the motion to make it steady and uniform. I connect these balance-wheels to the shaft by friction devices, which may consist of a collar, Q, fast to the shaft, and a friction-strap, R, with tightening-nuts S, connected to the pulleys, or a flanged collar, T, washer U, and tightening-bolts V, keyed to the shaft, or other equivalent devices.

W represents the feeder for pressing the hay down through the throat of the hopper. It is mounted on a rock-lever, $x$, pivoted on standards $y$ over the drive-gear, and weighted at $y'$, to raise the feeder out of the way of the follower when it goes forward. The feeder is forced down on the hay when the traverser goes back by the end of the pitman or an extension, $a$, coming in contact with a stud, $b$, on the connecting-rod $d$ of the lever $x$, when the crank-pin I rises to drive the follower forward.

The stud $b$ is adjustable, so as to be set to vary the action of the feeder as required. The feeder has a chamber, $e$, in which a fan is arranged for winnowing the hay to free it of the dust set free by the agitation to which it is subject in the process of packing. The fan is worked by one or more belts, $g$, passing from the driving-shaft up over guide-pulleys $h$ at the axis of the feeder-lever, to work without being affected by the vibrations of the lever.

*j* is a perforated metal bottom to the press-chamber B, to allow the heavy foreign matters to fall through and the dust to be blown out by the fan. The sides *k* of the press are adjustable to and from each other by means of posts *l* and *p*, connected by rods *n* and an adjusting-screw, *q*, working through the post *p*, and bearing upon a timber, *m*, at the rear of one of said sides *k*.

At A′ is represented a large opening through both sides of the case and the bottom, for greater convenience in tying the bale and for other purposes. The compression of the material being effected before it comes to these openings, it passes the openings without bulging out or expanding disadvantageously. The formation of the bale is substantially the same as in my Patents Nos. 132,639 and 132,566, hereinbefore referred to.

The traverser A is constructed with contracting or yielding front, to wedge together when the hay overlaps it, as heretofore secured to me by the patents referred to.

It will be observed that this device is even more essential in operating a press by belt than by lever, as the result would be more serious if the press should be brought to a sudden stop by means of a projecting lock of hay.

In operation the power is applied by belt, although rod-connections would answer if speeded high enough. The hay or other material is pitched into the hopper C and forced into the press-box B by the feeder E through means of the crank and pitman operating the rod *d* and rock-lever *x*. The continued revolution of the crank forces the traverser A forward, crowding the charge of hay into the space between the press-box B and the chamber F, and the operation is thus continued until a bale is formed, when a partition-follower is inserted and the bale bound through the opening A′ or the slots in the sides *k*, or both combined. Meantime more hay is fed into the press. The friction or resistance of the finished bale has now become so great that the belt and gearing would not force the bale forward, but the momentum or power accumulated in the balance-wheel would do so, even if the belt were cast. Another bale is then formed and forced along in the rear of the previously-formed bale, which still further increases the resistance; but the weight and accumulated power of the balance-wheel are such that the finished bales are forced along each successive stroke by means of the charge of fresh material added and the power or momentum of the balance-wheel accumulated during the reverse and advancing movement of the traverser. The bales are thus pressed, forced along, and ejected from the press by means of the momentum of the balance-wheel geared and connected to the reciprocating traverser A.

I have found by experiment that a machine freely driven by a three-inch belt cannot be driven with a nine-inch belt if the balance-wheel is removed; but the belt would tear asunder before the bales would start, and it would be impracticable to gear high enough to move or discharge the bales without the balance-wheel. It should further be observed that in this class of presses the pressing of the section cannot be accomplished at the extreme power of the toggle, as the stroke must move the section and the entire mass along at the time of pressing, so that the full amount of power is required when the traverser is within the thickness of the new section of the limit of its stroke and the pressed material just starting. This full power, however, can be obtained at this stage only by the use of the balance-wheel and intermediate gearing.

It will be thus seen that by the application of the balance-wheel, with suitable intermediate gearing, to this class of presses I am enabled to so concentrate the power as to utilize it at the proper time to simultaneously compress a section and force the finished bale along, and thus gradually eject it, using only a light strap to communicate power, and with a great saving of time and economy of power.

Having thus fully described my invention, what I claim, and desire to secure by Letters Patent, is—

1. In that class of baling-presses in which the bales are formed or built up of separately-compressed sections, the combination of a press-box, a bale-chamber, and a reciprocating traverser with a pitman, crank, and gearing for driving said traverser, and a balance wheel or wheels for storing up power and applying it through said gearing, crank, pitman, and traverser to the separate compression of each section of the forming bales, substantially as described.

2. In that class of baling-presses in which the bales are formed or built up of separately-compressed sections, the press-chamber provided with one or more openings, A′, in its walls, near its rear end, for the purpose of facilitating the application of the ties, substantially as described.

3. The rock-lever *x*, in combination with and adjustably applied to the crank and pitman, for the purpose set forth.

4. The horizontal baling-press case provided with a metal screen-bottom, *j*, in combination with the traverser A, for the purpose set forth.

5. The driving-pulleys or balance-wheels P, connected to the driving-shaft by friction devices, in combination with a crank and intermediate gear-wheels and shaft L, substantially for the purpose set forth.

6. The hollow feed-post or feeder *e*, in combination with a press-box having an outlet for the dust, substantially as shown and described.

7. In a continuously-operating baling-press, the combination of a reciprocating traverser, a press-chamber in which said traverser works and which is provided with a feed-opening, a hopper, and an automatic feeder arranged to pass down through the feed-opening and force the charges of material into the press-chamber in front of the traverser, substantially as described.

8. In a continuously-operating baling-press, the combination of a reciprocating traverser, a press-chamber, a condensing-chamber or hopper, a condenser, a feed-opening from the condensing-chamber to the press-chamber, and an automatic feeder for forcing the condensed charges of material into the press-chamber in front of the traverser, substantially as described.

PETER K. DEDERICK.

Witnesses:
W. A. SKINKLE,
C. R. DEDERICK.